(12) United States Patent
Venkateswarlu

(10) Patent No.: US 8,045,978 B2
(45) Date of Patent: Oct. 25, 2011

(54) APPARATUS AND METHOD FOR MANAGING TOOL KIT MENU OF PORTABLE TERMINAL IN ROAMING CONDITION

(75) Inventor: Suraparaju Venkateswarlu, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 757 days.

(21) Appl. No.: 11/871,629

(22) Filed: Oct. 12, 2007

(65) Prior Publication Data

US 2008/0090568 A1   Apr. 17, 2008

(30) Foreign Application Priority Data

Oct. 13, 2006 (KR) .................. 10-2006-0099708

(51) Int. Cl.
*H04Q 7/20* (2006.01)
(52) U.S. Cl. .............. 455/432.1; 455/558; 455/566
(58) Field of Classification Search .................. None
See application file for complete search history.

(56) References Cited

U.S. PATENT DOCUMENTS

2006/0079254 A1* 4/2006 Hogan ......................... 455/466
2006/0135174 A1* 6/2006 Kraufvelin et al. ......... 455/456.1

FOREIGN PATENT DOCUMENTS

| DE | 103 04 669 | 8/2004 |
|---|---|---|
| EP | 2 015 593 | 1/2009 |
| KR | 1020050096260 | 10/2005 |
| WO | WO 00/18156 | 3/2000 |

OTHER PUBLICATIONS

Digital Cellular Telecommunications System (Phase 2+); Specification of the SIM Application Toolkit for the Subscriber Identity Module—Mobile Equipment (SIM—ME) Interface, (3GPP TS 51.014 version 4.5.0 Release 4) ETSI TS 151 014, Dec. 2004.
Smart Cards; Card Application Toolkit (CAT) (Release 7); ETSI TS 102 223, Aug. 2006.

* cited by examiner

*Primary Examiner* — Phuoc Doan
(74) *Attorney, Agent, or Firm* — The Farrell Law Firm, P.C.

(57) ABSTRACT

Provided are an apparatus and method for managing a tool kit menu of a portable terminal in a roaming condition. The method includes updating, by a Subscriber Identity Module (SIM) tool kit module, location information based on broadcast information from the roaming network, creating, by the SIM tool kit module, a location event status based on the location information, providing, by the SIM tool kit module, the location event status to a SIM card module, updating, by the SIM card module, the tool kit menu based on the location event status, and providing the tool kit menu, by the SIM card module, to the SIM tool kit module.

13 Claims, 5 Drawing Sheets

APPARATUS AND METHOD FOR MANAGING TOOL KIT MENU OF PORTABLE TERMINAL IN ROAMING CONDITION

PRIORITY

This application claims priority under 35 U.S.C. §119(a) to an application filed in the Korean Intellectual Property Office on Oct. 13, 2006 and assigned Serial No. 2006-99708, the contents of which are incorporated herein by reference.

BACKGROUND OF THE INVENTION

1. Field of the Invention

The present invention relates to displaying menu items, and in particular, to an apparatus and method for managing a tool kit menu of a portable terminal in a roaming condition.

2. Description of the Related Art

Today, mobile communication through use of a portable terminal is regarded as personal necessity of life. In addition, the increasing number of users traveling from one country to another has resulted in a growing demand from the users of portable terminals, who want an international roaming service.

In a Global System for Mobile communication (GSM)-based mobile communication system, rather than a Code Division Multiple Access (CDMA) system, user authentication information is stored in a Subscriber Identity Module (SIM) card to authenticate a user, and thus a mobile communication service is provided to the authenticated user.

A SIM tool kit program is stored in a SIM card and is executed by a controller after booting a portable terminal. In general, the SIM tool kit program is produced by a service provider. A user can access a licensed service from the service provider by using the SIM card in which information required to use the service is stored.

However, a problem arises when a user moves to a specific region where a service is no longer available. While information on that service is present in a SIM card, the information may be displayed through a tool kit menu (or a user menu) of a portable terminal even though the service cannot be provided. This causes confusion to the user.

Moreover, when the user selects the unavailable service through the tool kit menu, an unnecessary process is performed for the unavailable service, thereby wasting resources.

SUMMARY OF THE INVENTION

The present invention provides an apparatus and method for managing a tool kit menu of a portable terminal in a roaming condition.

The present invention also provides an apparatus and method capable of avoiding a user's confusion by not displaying an unavailable service when a portable terminal is used in a roaming condition.

The present invention also provides an apparatus and method whereby an unavailable service is not displayed when a portable terminal is used in a roaming condition and thus a potential waste of resources can be avoided by not performing unnecessary processes.

According to one aspect of the present invention, there is provided a method for managing a tool kit menu of a portable terminal in a roaming network, the method including, for updating by a Subscriber Identity Module (SIM) tool kit module, location information based on broadcast information from the roaming network, creating, by the SIM tool kit module, a location event status based on the location information, providing, by the SIM tool kit module, the location event status to a SIM card module, updating, by the SIM card module, the tool kit menu based on the location event status, and providing, by the SIM card module, the tool kit menu to the SIM tool kit module.

According to another aspect of the present invention, there is provided a method for managing a tool kit menu of a portable terminal in a roaming network, the method including, updating, by a Subscriber Identity Module (SIM) tool kit module, location information based on broadcast information from the roaming network, creating, by the SIM tool kit module, a limited profile based on the location information, providing, by the SIM tool kit module, the limited profile to a SIM card module, creating, by the SIM card module, tool kit menu based on the limited profile, and providing, by the SIM card module, the tool kit menu to the SIM tool kit module.

According to still another aspect of the present invention, there is provided an apparatus for managing a tool kit menu of a portable terminal in a roaming network, the apparatus including a Subscriber Identity Module (SIM) tool kit module for updating location information based on broadcast information from the roaming network, creating a location event status based on the location information, and providing the location event status, and a SIM card module for updating the tool kit menu based on the location event status and providing the tool kit menu to the SIM tool kit module.

According to still another aspect of the present invention, there is provided an apparatus for managing a tool kit menu of a portable terminal in a roaming network, the apparatus including a Subscriber Identity Module (SIM) tool kit module for updating location information based on broadcast information from the roaming network, creating a limited profile based on the location information, and providing the limited profile, and a SIM card module for creating the tool kit menu based on the limited profile and providing the tool kit menu to the SIM tool kit module.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail. Terminology used herein should be determined in consideration of functionality of the present invention, and may vary depending on a user's or an operator's intention, or customs in the art. Therefore, corresponding meaning should be determined with reference to the entire specification.

Hereinafter, an apparatus and method for managing a tool kit menu of a portable terminal in a roaming condition will be described.

Figure 1:
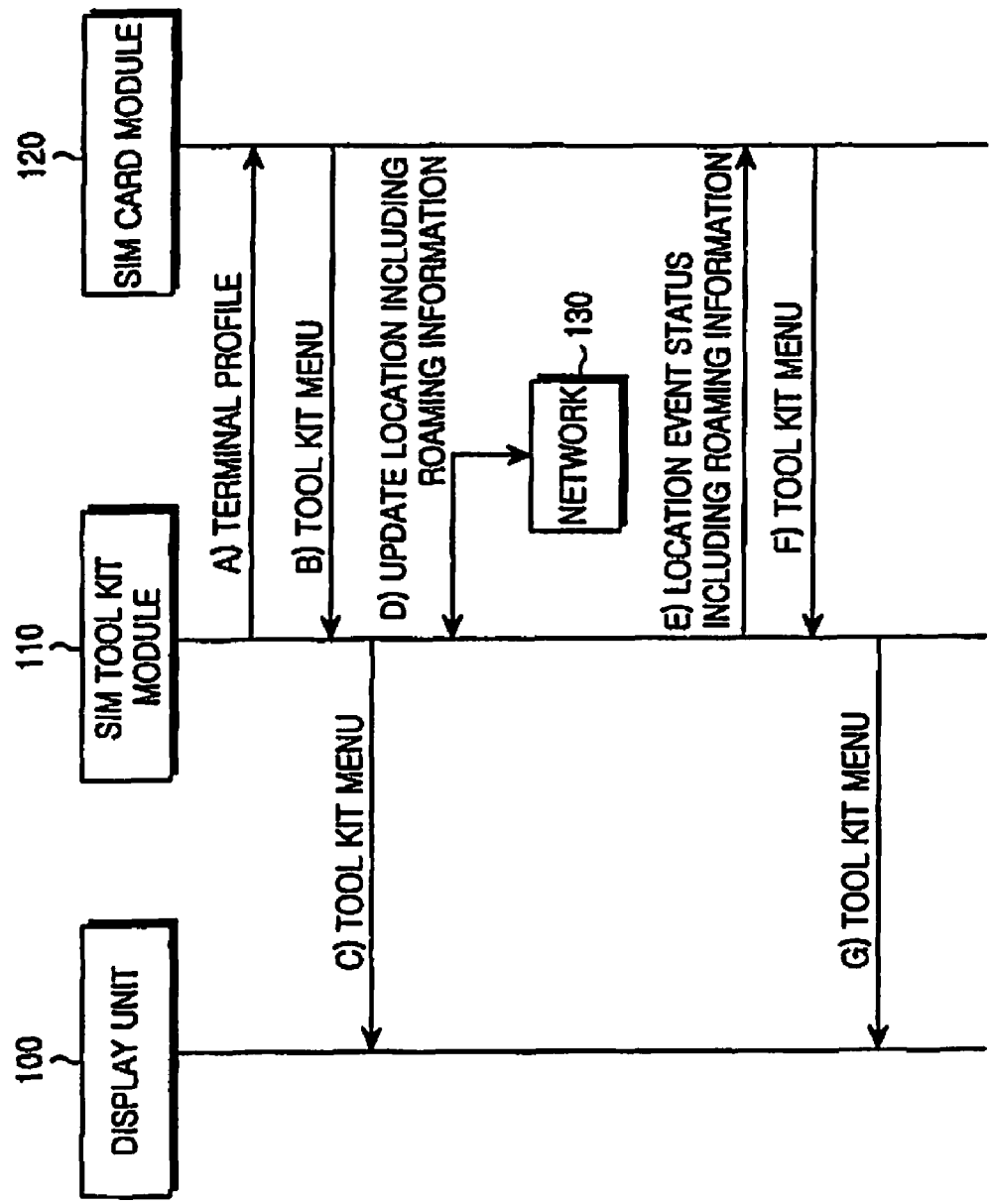
FIG. 1 illustrates a message flow for setting a tool kit menu when a portable terminal is used in a roaming condition according to a first embodiment of the present invention.

FIG. 1 illustrates a message flow for setting a tool kit menu when a portable terminal is used in a roaming condition according to a first embodiment of the present invention. Herein, a Subscriber Identity Module (SIM) card module 120 creates a tool kit menu suitable for use in a roaming network.

Referring to FIG. 1, upon booting the portable terminal, a SIM tool kit module 110 provides a terminal profile to the SIM card module 120, in step A. The terminal profile includes user authentication information, service information, etc.

The SIM card module 120 creates the tool kit menu (or a user menu) using the received terminal profile and then transmits the created tool kit menu to the SIM tool kit module 110, in step B. The tool kit menu received by the SIM tool kit module 110 is displayed on a display unit 100, in step C.

A location update process is then performed in step D. Since the portable terminal has been booted in a roaming area rather than a home area, different system information (e.g., a country code, a network code, etc.) for the roaming area must be provided to the portable terminal. Thus, the SIM tool kit module 110 provides a location event status to the SIM card module 120 in the format of an envelope command, in step E. The location event status includes network information (e.g., a country code, a network code, etc.) for a specific region and service information. The envelope command is used when the SIM tool kit module 110 transmits information to the SIM card module 120.

Upon receiving the location event status, the SIM card module 120 creates a tool kit menu (or a user menu) using the received location event status, and transmits the tool kit menu to the tool kit module 110, in step F. The location event status received by the SIM tool kit module 110 is then displayed on the display unit 100, in step G.

When a specific service is not supported in the roaming area, the SIM card module 120 transmits a setup menu command whose menu count is equal to 0. Thus, the SIM tool kit module 110 deletes a tool kit menu item corresponding to the specific service from an application list.

Figure 2:
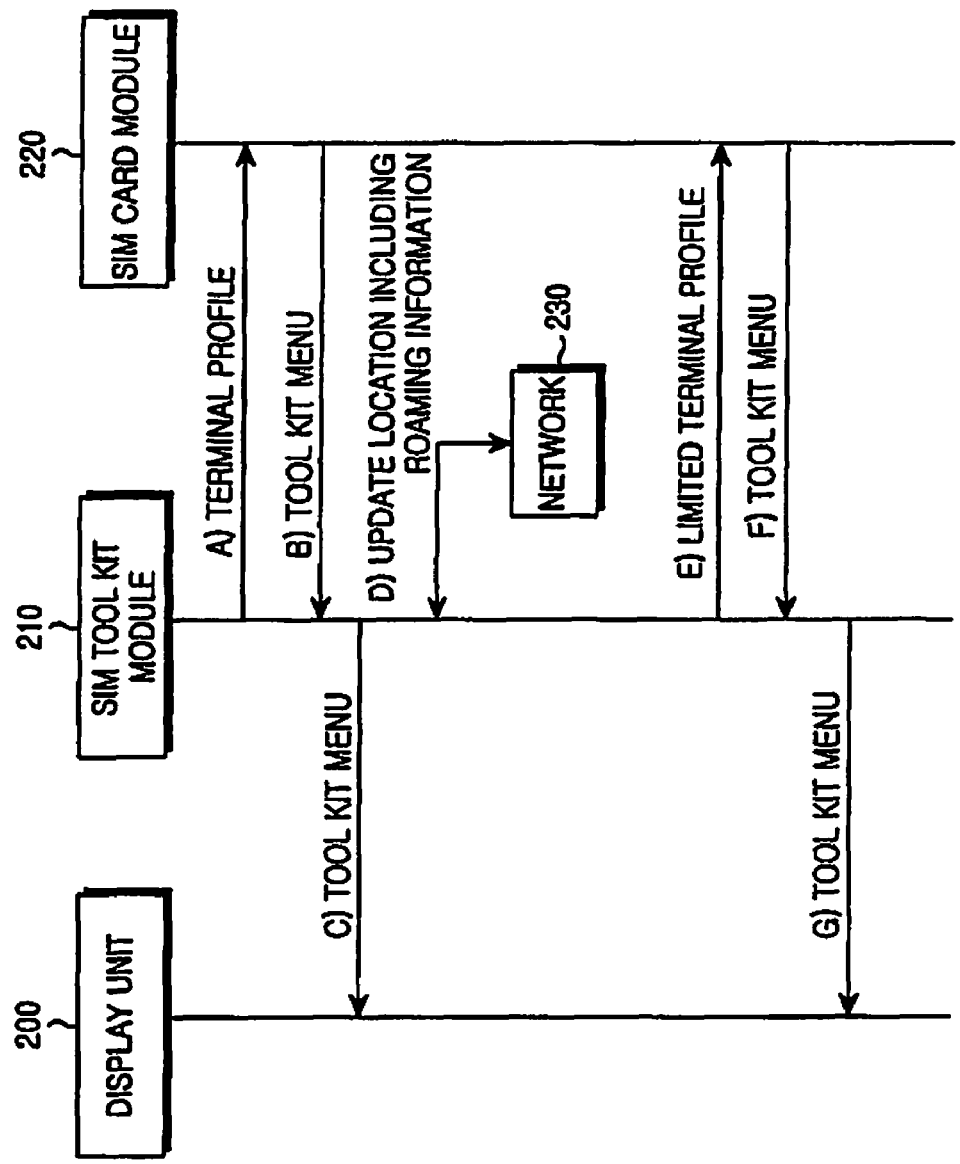
FIG. 2 illustrates a message flow for setting a tool kit menu when a portable terminal is used in a roaming condition according to a second embodiment of the present invention.

FIG. 2 illustrates a message flow for setting a tool kit menu when a portable terminal is used in a roaming condition according to a second embodiment of the present invention. Herein, a SIM tool kit module 220 creates a terminal profile suitable for use in a roaming network.

Referring to FIG. 2, upon booting the portable terminal, a SIM tool kit module 210 provides the terminal profile to the SIM card module 220, in step A. The terminal profile includes user authentication information, service information, etc.

The SIM card module 220 creates a tool kit menu (or a user menu) using the received terminal profile and then transmits the created tool kit menu to the SIM tool kit module 210, in step B. The tool kit menu received by the SIM tool kit module 210 is then displayed on a display unit 200, in step C.

A location update process is then performed, in step D. Since the portable terminal has been booted in a roaming area rather than a home area, different system information (e.g., a country code, a network code, etc.) for the roaming area has to be provided to the portable terminal.

In this case, the SIM tool kit module 210 creates a limited terminal profile in the format of an envelope command, and provides the limited terminal profile to the SIM card module 220 (step E). The limited terminal profile includes network information (e.g., a country code, a network code, etc.) for a specific region and service information. The envelope command is used when the SIM tool kit module 210 transmits information to the SIM card module 220.

Upon receiving the limited terminal profile, the SIM card module 220 creates a tool kit menu (or a user menu) using the received limited terminal profile, and transmits the tool kit menu to the tool kit module 210, in step F. The limited terminal profile received by the SIM tool kit module 210 is then displayed on the display unit 200, in step G.

Figure 3:
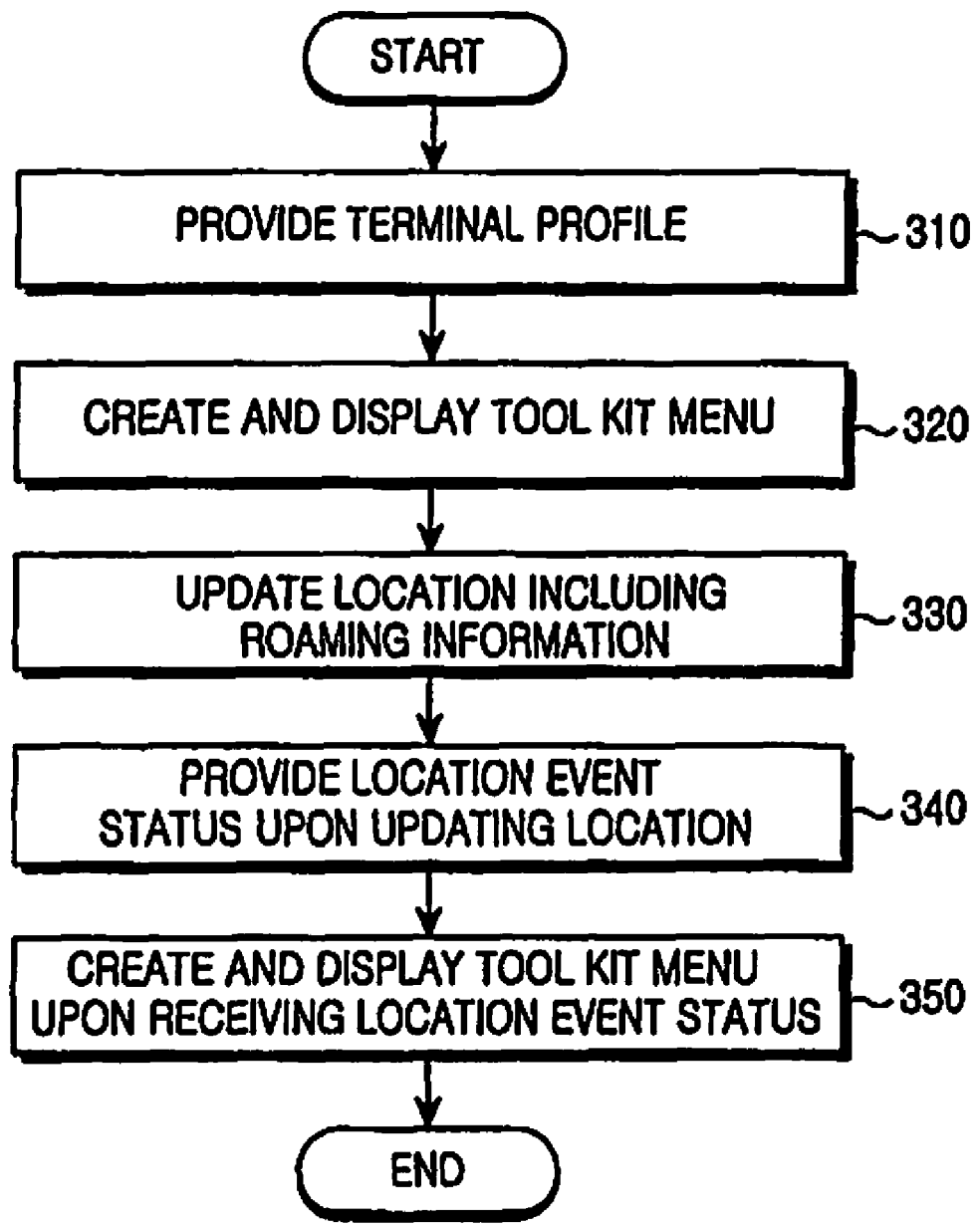
FIG. 3 is a flowchart for setting a tool kit menu when a portable terminal is used in a roaming condition according to a first embodiment of the present invention.

FIG. 3 is a flowchart for setting a tool kit menu when a portable terminal is used in a roaming condition according to a first embodiment of the present invention. Herein, a SIM card module creates a tool kit menu suitable for use in a roaming network.

Referring to FIG. 3, upon booting the portable terminal, a SIM tool kit module provides a terminal profile to the SIM card module, in step 310. The terminal profile includes user authentication information, service information, etc.

The SIM card module creates a tool kit menu (or a user menu) using the received terminal profile and then transmits the created tool kit menu to the SIM tool kit module. The tool kit menu received by the SIM tool kit module is then displayed on a display unit (step 320).

A location update process is then performed, in step 330. Since the portable terminal has been booted in a roaming area rather than a home area, different system information (e.g., a country code, a network code, etc.) for the roaming area has to be provided to the portable terminal. Thus, the SIM tool kit module provides a location event status to the SIM card module in the format of an envelope command, in step 340. The location event status includes network information (e.g., a country code, a network code, etc.) for a specific region and service information. The envelope command is used when the SIM tool kit module transmits information to the SIM card module.

Upon receiving the location event status, the SIM card module creates a tool kit menu (or a user menu) using the received location event status, and transmits the tool kit menu to the tool kit module. The location event status received by the SIM tool kit module is then displayed on the display unit, in step 350.

When a specific service is not supported in the roaming area, the SIM card module transmits a setup menu command whose menu count is equal to 0. Thus, the SIM tool kit module deletes a tool kit menu item corresponding to the specific service from an application list.

The procedure then ends.

Figure 4:
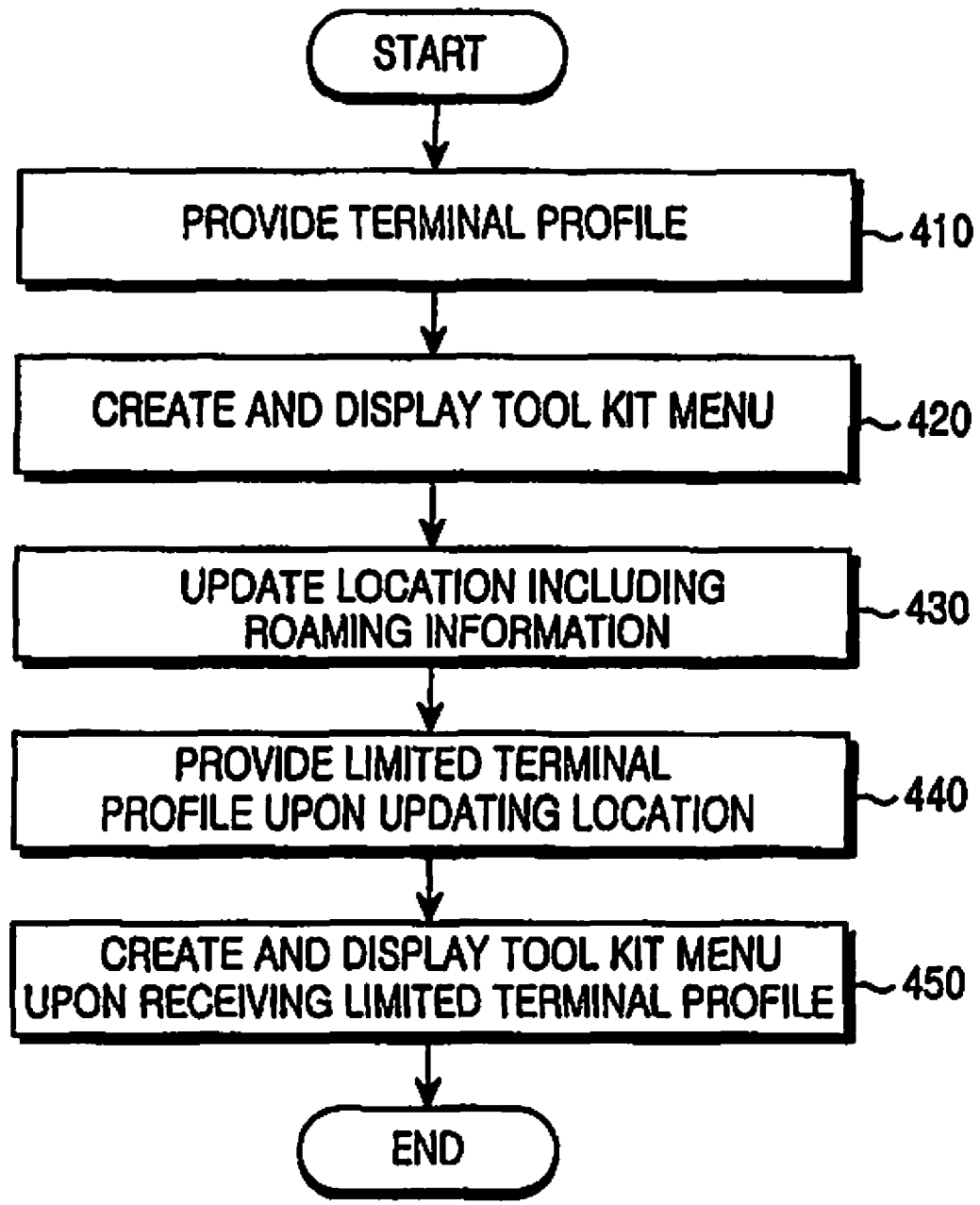
FIG. 4 illustrates a message flow for setting a tool kit menu when a portable terminal is used in a roaming condition according to the second embodiment of the present invention.

FIG. 4 illustrates a message flow for setting a tool kit menu when a portable terminal is used in a roaming condition according to a second embodiment of the present invention. Herein, a SIM tool kit module creates a terminal profile suitable for use in a roaming network.

Referring to FIG. 4, upon booting the portable terminal, a SIM tool kit module provides the terminal profile to the SIM card module, in step 410. The terminal profile includes user authentication information, service information, etc.

The SIM card module creates a tool kit menu (or a user menu) using the received terminal profile and then transmits the created tool kit menu to the SIM tool kit module. The tool kit menu received by the SIM tool kit module is then displayed on a display unit, in step 420.

A location update process is then performed, in step 430. Since the portable terminal has been booted in a roaming area rather than a home area, different system information (e.g., a country code, a network code, etc.) for the roaming area has to be provided to the portable terminal. In this case, the SIM tool kit module creates a limited terminal profile to the SIM card module in the format of an envelope command, and provides the limited terminal profile to the SIM card module, in step 440. The limited terminal profile includes network information (e.g., a country code, a network code, etc.) for a specific region and service information. The envelope command is used when the SIM tool kit module transmits information to the SIM card module.

Upon receiving the limited terminal profile, the SIM card module creates a tool kit menu (or a user menu) using the received limited terminal profile, and transmits the tool kit menu to the tool kit module. The location event status received by the SIM tool kit module is then displayed on the display unit, in step 450.

The procedure then ends.

Figure 5:
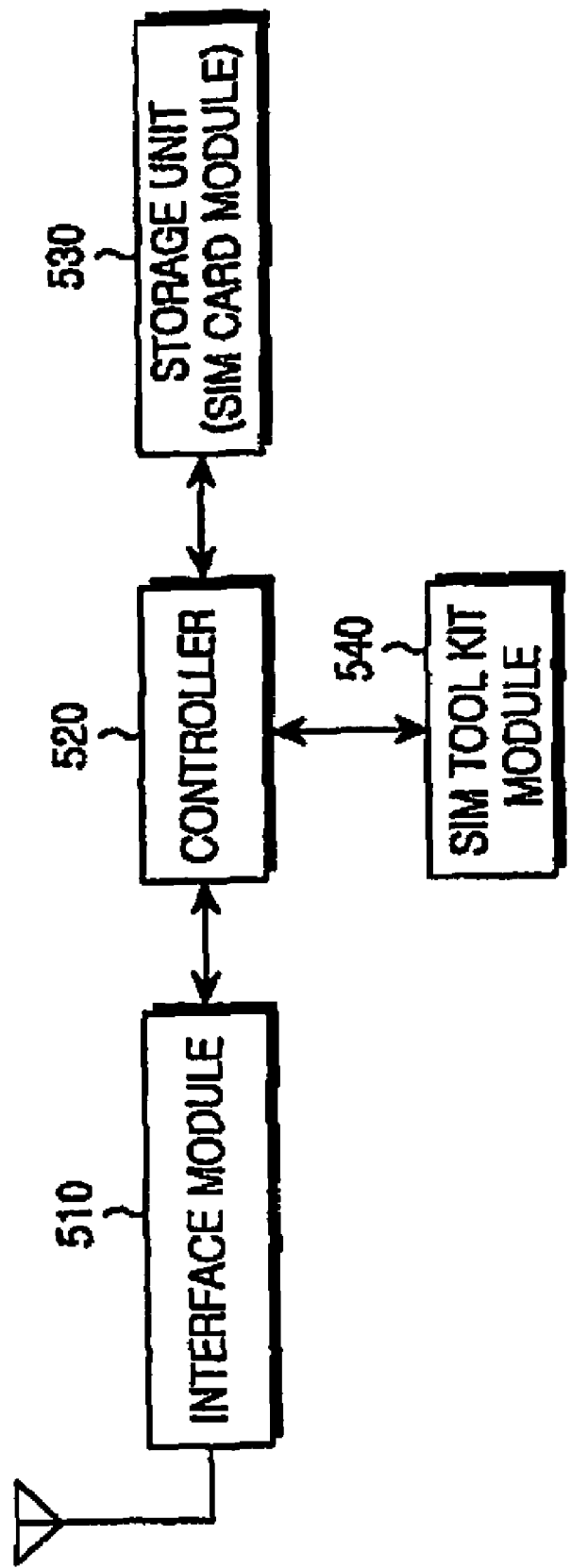
FIG. 5 is a block diagram of a portable terminal according to the present invention.

FIG. 5 is a block diagram of a portable terminal of the present invention.

Referring to FIG. 5, the portable terminal includes an interface module 510, a controller 520, a storage unit (or a SIM card module) 530, and a SIM tool kit module 540. In the present invention, the storage unit 530 includes a SIM card module, and for convenience of description, hereinafter, the same reference number will be used to indicate the storage unit 530 and the SIM card module 530. The interface module 510 allows communication between different nodes. The interface module 510 includes a Radio Frequency (RF) processor, a base-band processor, etc. The RF processor converts a signal received via an antenna into a base-band signal, and transmits the converted base-band signal to the base-band processor. Further, the RF processor converts the base-band signal received from the base-band processor into an RF signal, and transmits the converted RF signal through the air via the antenna.

The controller 520 controls overall operations of the portable terminal. For example, voice calls and data communications are processed under the control of the controller 520. In addition to a general control function, the controller 520 controls the SIM tool kit module 540 and the SIM card module 530 so as to create a tool kit menu suitable for use in a roaming network. A user input is received through the tool kit menu.

After a location update process is performed, the SIM tool kit module 540 provides a location event status to the SIM card module 530 under the control of the controller 520, wherein the location event status includes network information (e.g., a country code, a network code, etc.) for a roaming area and service information. The created tool kit menu is received from the SIM card module 530 and is then displayed on a display unit (not shown) according to the location event status. A user input is received through the tool kit menu.

Furthermore, after the location update process is performed, the SIM tool kit module 540 creates a limited terminal profile and provides the limited terminal profile to the SIM card module 530, wherein the limited terminal profile includes network information (e.g., a country code, a network code, etc.) for a specific region and service information. A tool kit menu (or a user menu) is received from the SIM card module 530 and is then displayed on the display unit (not shown) according to the limited terminal profile. A user input is received through the tool kit menu.

The storage unit 530 stores a program for controlling overall operations of the portable terminal and also stores data temporarily produced while performing the program. In the present invention, as mentioned above, the SIM card module 530 is included in the storage unit 530.

The SIM card module 530 receives the location event status and then creates a tool kit menu according to the received location event status. Alternatively, the SIM card module 530 creates a tool kit menu according to the limited terminal profile.

The controller 520 may perform functions of the SIM tool kit module 540 and the SIM card module 530. Although these components 520, 530, and 540 are separately depicted in FIG. 5, this configuration is only for explanation, and, in practice, the functions of the SIM tool kit module 540 and the SIM card module 530 may be entirely or partially performed by the controller 520.

According to the present invention, since a service that is not available in a roaming network is not displayed on a tool kit menu, a user can avoid selecting an unavailable service. Therefore, an unnecessary process is not performed, thereby preventing a waste of resources.

Alternate embodiments of the present invention can also comprise computer readable codes on a computer readable medium. The computer readable medium includes any data storage device that can store data that can be read by a computer system. Examples of a computer readable medium include magnetic storage media (such as Read-Only Memory (ROM), floppy disks, and hard disks, among others), optical recording media (such as Compact Disc (CD)-ROMs or Digital Versatile Discs (DVDs)), and storage mechanisms such as carrier waves (such as transmission through the Internet). The computer readable medium can also be distributed over network coupled computer systems so that the computer readable code is stored and executed in a distributed fashion. Also, functional programs, codes, and code segments for accomplishing the present invention can be construed by programmers of ordinary skill in the art to which the present invention pertains.

While the invention has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A method of managing a tool kit menu of a portable terminal in a roaming network, the method comprising:
   updating, by a Subscriber Identity Module (SIM) tool kit module, location information based on broadcast information from the roaming network;
   creating, by the SIM tool kit module, a location event status based on the location information;
   providing, by the SIM tool kit module, the location event status to a SIM card module;
   updating, by the SIM card module, the tool kit menu based on the location event status; and
   providing, by the SIM card module, the tool kit menu to the SIM tool kit module,
   wherein the location event status is network information, which includes a country code and a network code and service information of the roaming network, and
   wherein the tool kit menu updated based on the location event status is a menu in which the service not supported by the roaming network is deleted.

2. The method of claim 1, further comprising;
outputting, by the SIM tool kit module, the tool kit menu.

3. A method of managing a tool kit menu of a portable terminal in a roaming network, the method comprising:
updating, by a Subscriber Identity Module (SIM) tool kit module, location information based on broadcast information from the roaming network;
creating, by the SIM tool kit module, a limited profile based on the location information;
providing, by the SIM tool kit module, the limited profile to a SIM card module, by using an envelope command;
creating, by the SIM card module, the tool kit menu based on the limited profile; and
providing, by the SIM card module, the tool kit menu to the SIM tool kit module.

4. The method of claim 3, further comprising;
outputting, by the SIM tool kit module, the tool kit menu.

5. The method of claim 3, wherein the limited profile is a profile in which a service not supported by the roaming network is deleted.

6. The method of claim 3, the tool kit menu created based on the limited profile is a menu in which a service not supported by the roaming network is deleted.

7. An apparatus for managing a tool kit menu of a portable terminal in a roaming network, the apparatus comprising:
a Subscriber Identity Module (SIM) tool kit module for updating location information based on broadcast information from the roaming network, creating a location event status based on the location information and providing the location event status; and
a SIM card module for updating the tool kit menu based on the location event status and providing the tool kit menu to the SIM tool kit module,
wherein the location event status is network information, which includes a country code and a network code and service information of the roaming network, and wherein the tool kit menu updated based on the location event status is a menu in which the service not supported by the roaming network is deleted.

8. The apparatus of claim 7, wherein the SIM tool kit module outputs the tool kit menu.

9. An apparatus for managing a tool kit menu of a portable terminal in a roaming network, the apparatus comprising:
a Subscriber Identity Module (SIM) tool kit module for updating location information based on broadcast information from the roaming network, creating a limited profile based on the location information, and providing the limited profile, by using an envelope command; and
a SIM card module for creating the tool kit menu based on the limited profile, and providing the tool kit menu to the SIM tool kit module.

10. The apparatus of claim 9, wherein the SIM tool kit module outputs the tool kit menu.

11. The apparatus of claim 9, wherein the limited profile is a profile in which a service not supported by the roaming network is deleted.

12. The apparatus of claim 9, the tool kit menu created based on the limited profile is a menu in which a service not supported by the roaming network is deleted.

13. A Computer-readable recording medium having recorded thereon a program for managing a tool kit menu of a portable terminal in a roaming network, comprising;
a first code segment for updating location information based on broadcast information from the roaming network;
a second code segment for creating a location event status based on the location information;
a third code segment for updating the tool kit menu based on the location event status; and
a fourth code segment for outputting the tool kit menu,
wherein the location event status is network information, which includes a country code and a network code and service information of the roaming network, and wherein the tool kit menu updated based on the location event status is a menu in which the service not supported by the roaming network is deleted.

* * * * *